United States Patent [19]
Fisher

[11] Patent Number: 5,771,922
[45] Date of Patent: Jun. 30, 1998

[54] FLOW RESTRICTOR

[76] Inventor: Raymond E. Fisher, 14511 Sandy Creek, Houston, Tex. 77070

[21] Appl. No.: 546,001

[22] Filed: Oct. 23, 1995

[51] Int. Cl.⁶ .................................................. B01D 21/26
[52] U.S. Cl. .......................... 137/546; 210/304; 210/306; 210/512.1
[58] Field of Search ............................ 137/546; 210/304, 210/306, 512.1; 138/42, 44

[56] References Cited

U.S. PATENT DOCUMENTS

| | | | |
|---|---|---|---|
| 583,394 | 5/1897 | Brainerd | 137/182 |
| 722,650 | 3/1903 | Brainerd | 137/182 |
| 864,345 | 8/1907 | Tollefson | 210/306 |
| 1,084,978 | 1/1914 | Sullivan | 210/306 |
| 2,198,819 | 4/1940 | Holm | 210/304 |
| 2,501,593 | 3/1950 | Becker | 138/44 |
| 2,726,072 | 12/1955 | Hermann | 138/42 X |
| 3,072,261 | 1/1963 | Smith | 138/42 X |
| 3,894,562 | 7/1975 | Moseley, Jr. et al. | 138/44 |
| 3,921,672 | 11/1975 | Arnold | 138/42 |
| 4,234,008 | 11/1980 | Cronfel | 137/182 |
| 4,251,375 | 2/1981 | Pakki et al. | 210/304 |
| 4,657,671 | 4/1987 | Botstiber et al. | 210/304 X |

Primary Examiner—John Rivell
Attorney, Agent, or Firm—Guy McClung

[57] ABSTRACT

The present invention, in one embodiment, teaches a flow restrictor which accomplishes within a single unitary integral device cyclonic separation of larger, heavier solids from lighter smaller solids; collection of retained solids in a relatively large collection chamber; straining of certain solids to further protect the device from plugging; and flushing a fluid, e.g. the primary flow stream, through the device to facilitate removal of collected solids.

In one embodiment a device according to this invention has a main body with a fluid inlet and a fluid outlet. Fluid flowing in through the inlet encounters a vaned end of a hollow mandrel with one or more vanes or a mandrel with a deflector thereon or both which induce turbulent flow in the fluid and directs solids entrained therein away from the mandrel to a solids collection area or chamber within the main body. Fluid flows into one or more hole in the mandrel and through a flow channel through the mandrel to an exit orifice and then through an exhaust port to the device outlet. An optional selectively accessible flush port may be provided to flush solids from the collection chamber.

7 Claims, 3 Drawing Sheets

FLOW RESTRICTOR

BACKGROUND OF THE INVENTION

1. Field of the Invention

This invention is directed to flow restrictors and, in one aspect, to a single flow restricting device which separates solids from a flow of fluid, retains solids, strains solids, and flushes collected solids.

2. Description of Related Art

The prior art discloses a wide variety of devices for restricting the flow of liquids and gasses by providing a fixed restriction in a flow channel or conduit.

If a restriction in a flow restrictor is too small, it becomes plugged by solids in the fluid. Using a flushing liquid to break up and flush out such solids can result in erosion of such restrictions. A variety of attempts have been made to reduce plugging and reduce the effects of erosion. In certain prior art devices, instead of one very small restriction, larger multiple restrictions are provided to break pressure in more than one step (U.S. Pat. No. 3,954,124, U.S. Pat. No. 3,983,903, and U.S. Pat. No. 3,409,382). In other prior art devices a single, small restriction is provided with a protective screen in front of the restriction (U.S. Pat. No. 3,887,895, U.S. Pat. No. 3,109,459, U.S. Pat. No. 3,668,822, and U.S. Pat. No. 2,635,641). The multiple restriction designs are relatively complex, costly to manufacture and install, difficult to disassemble for inspection and maintenance, and difficult to reconfigure at an installation. The single small restriction designs use screens that are fragile, easily eroded or corroded, and easily plugged. Such devices may be installed with gaskets or threading at which leaks may occur.

U.S. Pat. No. 4,234,008 discloses a fluid choke which does not provide for the separation of larger solids from smaller solids or allow the smaller solids to pass without plugging or fouling.

In addition to the use of a strainer, filter or screen upstream from a flow-restricting orifice, certain prior art systems use a cyclonic separator upstream from the orifice. Each of these items is purchased and installed separately. Other prior art devices integrate a strainer and orifice into a single flow restricting device, but such devices do not provide for the separation of larger solids from smaller solids to allow the smaller solids to pass through the device without plugging or fouling. Such devices also have limited solids retention capacity (requiring frequent cleaning or replacement and provide for flushing only by disassembling the device.

SUMMARY OF THE PRESENT INVENTION

The present invention, in one embodiment, teaches a flow restrictor which accomplishes within a single unitary integral device cyclonic separation of larger, heavier solids from lighter smaller solids; collection of retained solids in a relatively large collection chamber; straining of certain solids to further protect the device from plugging; and flushing through a flushing port from the device to facilitate removal of collected solids during normal service.

In one embodiment a device according to this invention has a main body with a fluid inlet and a fluid outlet. Fluid flowing in through the inlet encounters a vaned end of a hollow mandrel with one or more vanes which induce cyclonic flow in the fluid and directs solids entrained therein away from the mandrel to a solids collection area or chamber within the main body. Fluid flows into holes in the mandrel and through a central longitudinal flow channel through the mandrel to an exit orifice and then through an exhaust port to the device outlet. An optional selectively accessible flush port may be provided to flush solids from the collection chamber. One or more ribs, either flat or spiralled, may be used instead of or in addition to the one or more vanes; and a single plate or two plate shield may be used for each hole.

In one aspect in such a device the holes in the mandrel are sized to prevent entry into the mandrel of solids which could flow to the mandrel exit orifice and plug it. Cyclonic action induced by the vaned end of the mandrel can be enhanced by arranging the holes in the mandrel in an alternating and/or spiral pattern.

It is, therefore, an object of at least certain preferred embodiments of the present invention to provide:

New, useful, unique, efficient, nonobvious devices and methods for restricting fluid flow in a flow channel or conduit, including gas, liquid or vapor flow;

Such devices in which a plurality of flow enhancing functions are accomplished in a single unitary device;

Such devices which direct entrained solids away from exit channel(s) for collection in an interior collection area or chamber; and Such devices which provide for easy flushing of large solids without removal of the device from a point of installation.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figures 1, 2:
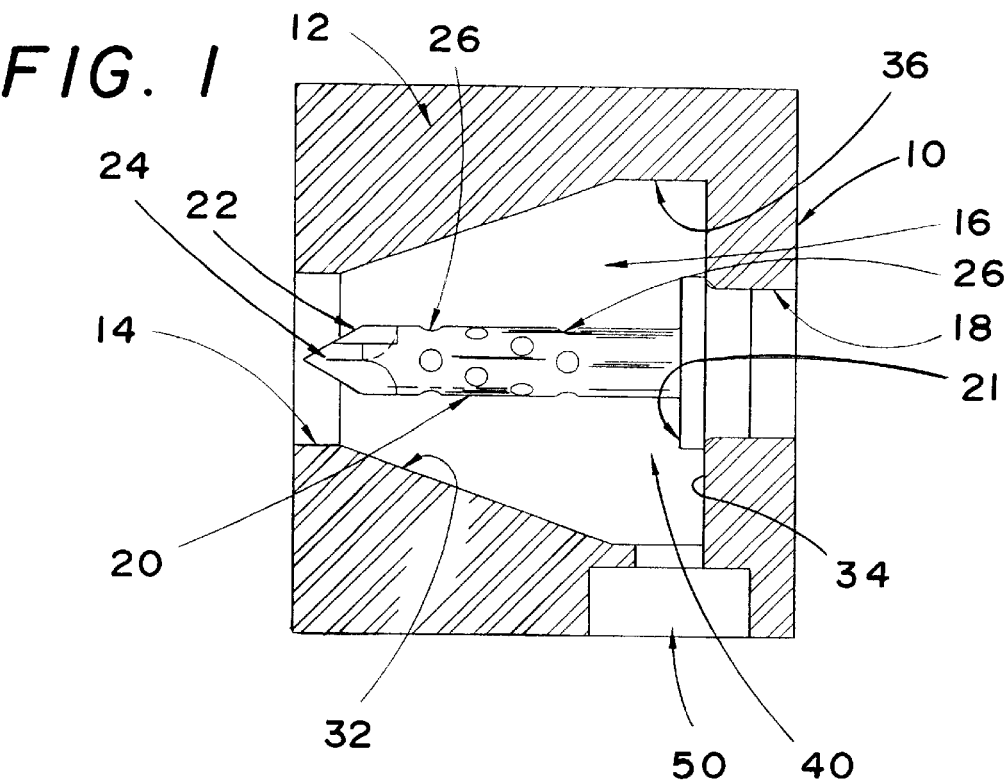
FIG. 1 is a side cross-sectional view of a device according to the present invention.
FIG. 2 is a side cross-sectional view of a device according to the present invention.
Figure 3:
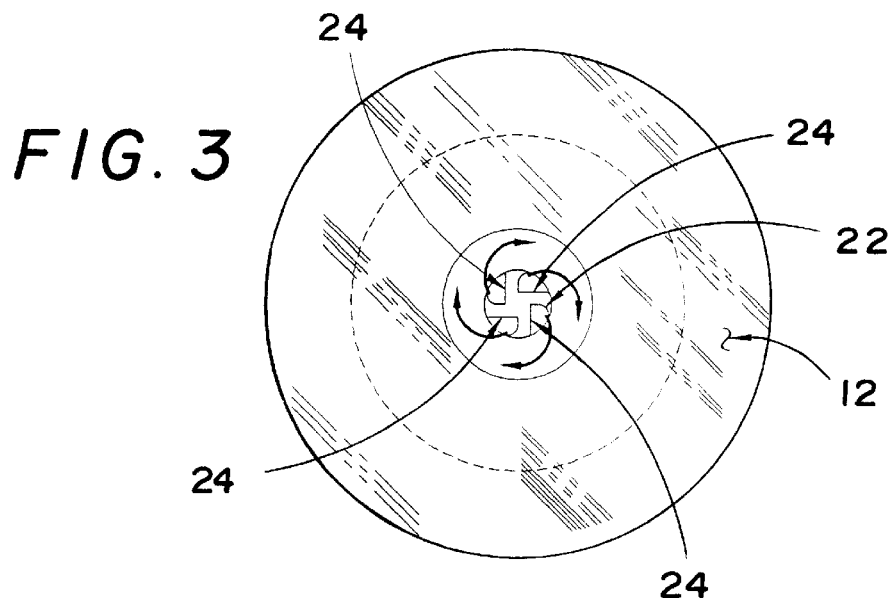
FIG. 3 is an end view of the device of FIG. 1.

Referring now to FIG. 1, a device 10 has a main body 12 (made, e.g., from plastic, PTFE, metal, fiberglass, composites or any suitable material or combination thereof) with a fluid flow inlet 14, an interior space 16, and a fluid flow outlet 18. A hollow mandrel 20 has an end 22 disposed partially in the inlet 14 (it is, preferably, positioned in, at, near, or adjacent the inlet 14). The end 22 has a plurality of vanes 24 which induce turbulence in a fluid flowing into the inlet 12 and which direct solids entrained in the fluid away from the mandrel 20. Holes 26 in the mandrel 20 are in fluid communication with an interior central flow channel 28 along the length of the mandrel 20. In one preferred embodiment the holes 26 are sized to prevent a solid particle from entering the mandrel's central flow channel 28 that would be large enough to plug the channel 28 or its outlet 31. The mandrel 20 has a base 21 which abuts an inner shoulder 23 of the body 12. The device and its various pieces may be made from one or more of the previously mentioned materials depending on the nature of the flowing fluid and of solids entrained therein.

The interior space 16 of the main body 12 is, preferably, configured so that a tapered surface 32 forms an expanded area (as compared to the size of the inlet 14) into which solids deflected by the vanes 24 may flow. Such solids flow to and are collected in a solids collection area or chamber 40 defined by an interior end wall 34 of the interior space 16 and a side wall 36. Preferably the holes 26 are positioned so that they will not be plugged by solids accumulating in the solids collection chamber 40.

Cyclonic flow of the fluid and re-direction of solids entrained therein is enhanced in certain preferred embodiments by positioning the holes 26 in a spiral pattern as shown in FIGS. 1 and 2.

Flushing of the solids collection chamber 40 is possible by removing a plug (e.g. a plug 70 as in FIG. 4) from a flush port 50 through which a flushing fluid is fed through the body 12 into the solids collection chamber 40. The source of fluid for introduction into the flush port 50 may be any suitable fluid source, including but not limited to the source of fluid that flows to the inlet 14.

In certain preferred embodiments the central flow channel 28 of the mandrel 20 is in fluid communication with a tapered exhaust orifice 27 which effects a gradual deceleration of fluid flowing from the mandrel 20 to the outlet 18, thus reducing the possibility of downstream cavitation when the fluid is a liquid.

Figure 4:
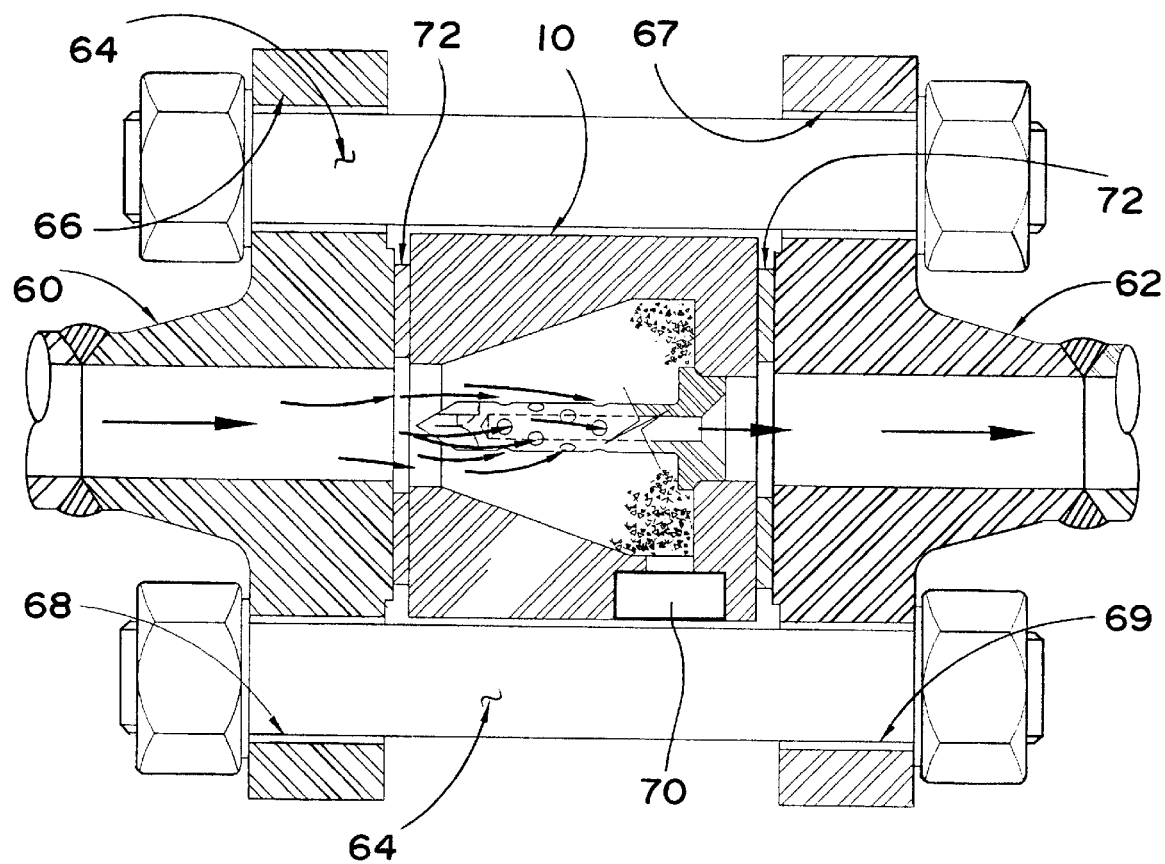
FIG. 4 is a side cross-sectional view of a device according to the present invention between two flanges.

FIG. 4 illustrates a device 10 clamped between a first pipe flange 60 and a second pipe flange 62 held together by bolts 64 through holes 66, 67, and 68, 69 respectively. Gaskets 72 may be used to enhance sealing between the device 10 and the flanges 60, 62. Of course devices according to this invention may be welded to conduits or pipe or may have threaded ends for mating with threaded pipe or conduits.

Figure 5:
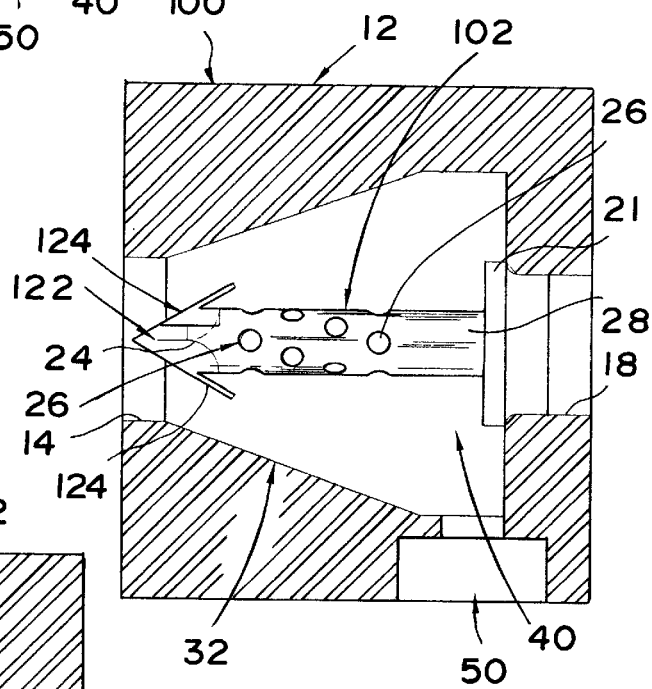
FIG. 5 is a side cross-sectional view of a device according to the present invention.

FIG. 5 illustrates a device 100 according to the present invention which is like the device 10, previously described, and for which the same identifying numerals indicate the same structure or item. An end 122 of a mandrel 102 has two deflection plates 124 mounted thereon or formed integrally thereof to deflect material away from the mandrel 102 and its holes 26. The two deflector plates meet along a line near the inlet 14 and two vanes 24 (one shown) are disposed between them, a first vane on one side of the mandrel and a second vane on the other side diametrically opposed to the first vane.

Figure 6:
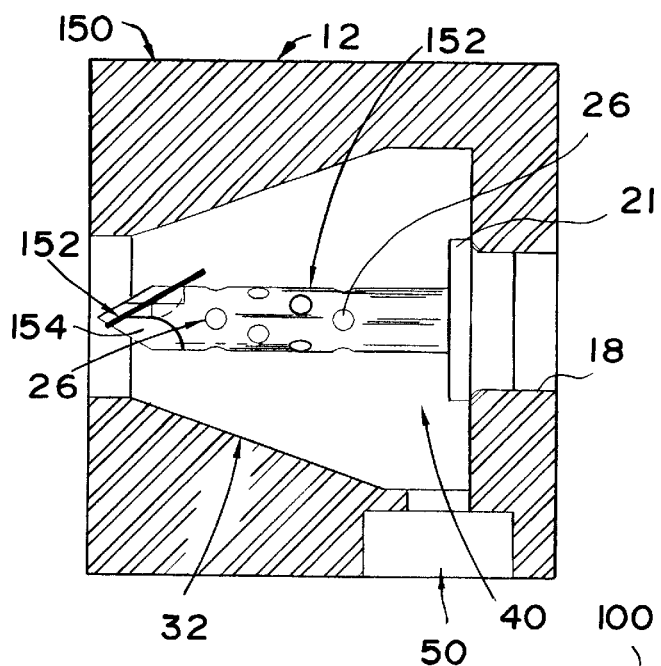
FIG. 6 is a side cross-sectional view of a device according to the present invention.

FIG. 6 illustrates a device 130 according to the present invention which is like the devices 10 and 100, previously described, and for which the same identifying numerals indicate the same structure or item. An end 154 of a mandrel 152 has a deflection plate 156 mounted thereon or formed integrally thereof to deflect material away from the mandrel 152 and its holes 26.

Figure 7:
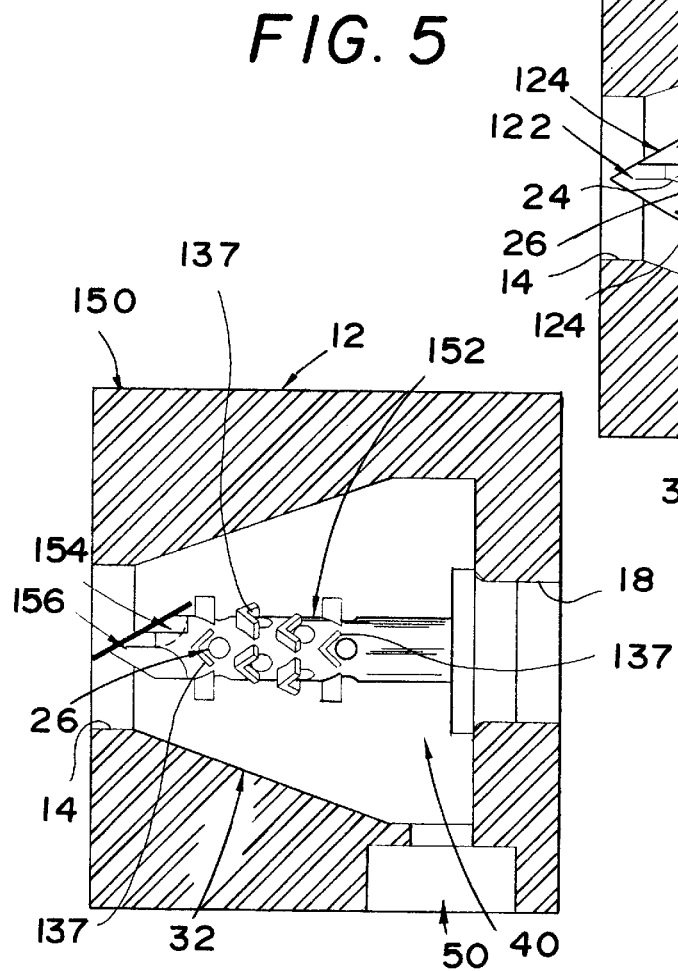
FIG. 7 is another embodiment of the device of FIG. 6.

FIG. 7 illustrates the device 130 with a shield 137 shielding each hole 26 in the mandrel 152. Such a shield may be used on one, some, or all the holes of any mandrel in any embodiment of this invention. In one aspect such shields may be used on the holes nearest the inlet 14 and their ends may be formed, configured or extended to form a shielding skirt around the mandrel. Such shields may be any appropriate shape including but not limited to crescent, arrow point (as shown), or three sides of a rectangle or square.

It is within the scope of this invention to use a deflector plate or plates and/or a hole shield or shields with a mandrel having no vane, one vane, or a plurality of vanes at its inlet end. One or more vanes may be used with any mandrel disclosed herein. It is also within the scope of this invention to use a single circumferential deflector which forms a cone or shroud with its apex pointing toward the inlet around the end of the mandrel to deflect fluid away from the mandrel.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A flow restrictor for restricting fluid flow through a flow channel, the flow restrictor disposable to intercept and restrict the fluid flow, the flow restrictor comprising a body with an interior space therein and an inlet and an outlet in fluid communication with the interior space, a hollow mandrel with a first end, a second end, and a mandrel flow channel therethrough, a plurality of holes through the mandrel in fluid communication with the mandrel flow channel, the mandrel flow channel blocked at a first end thereof and open at a second end thereof in fluid communication with the outlet of the body so that fluid flowing into the inlet of the body flows through the holes, through the mandrel, to the outlet of the body, and out from the body, the hollow mandrel's first end having flow directing means for directing flow of fluid entering the body through the inlet and for directing solids entrained in said fluid away from the hollow mandrel, the flow directing means comprising a hole shield about each hole to direct solids away from the holes, and the hole shields connected to each other.

2. A flow restrictor for restricting fluid flow through a flow channel, the flow restrictor disposable to intercept and restrict the fluid flow, the flow restrictor comprising a body with an interior space therein and an inlet and an outlet in fluid communication with the interior space, a hollow mandrel with a first end, a second end, and a mandrel flow channel therethrough, at least one hole through the mandrel in fluid communication with the mandrel flow channel, the mandrel flow channel blocked at a first end thereof and open at a second end thereof in fluid communication with the outlet of the body so that fluid flowing into the inlet of the body flows through the at least one hole, through the mandrel, to the outlet of the body, and out from the body, the hollow mandrel's first end having flow directing means for directing flow of fluid entering the body through the inlet and for directing solids entrained in said fluid away from the hollow mandrel, the flow directing means comprising at least two deflection plates mounted to the hollow mandrel at an end near the inlet, and the two deflection plates meeting along a line near the inlet of the body.

3. The flow restrictor of claim 2 further comprising two flow-directing vanes, a first vane disposed between the deflector plates and on one side of the hollow mandrel and a second vane disposed between the deflector plates and on a side of the hollow mandrel diametrically opposed to the first vane.

4. A flow restrictor for restricting fluid flow through a flow channel, the flow restrictor disposable to intercept and restrict the fluid flow, the flow restrictor comprising a body with an interior wall and with an interior space therein and an inlet and an outlet in fluid communication with the interior space, a hollow mandrel with a first end, a second end, and a mandrel flow channel therethrough, the first end spaced apart from the interior wall of the body, at least one hole through the mandrel in fluid communication with the mandrel flow channel, the mandrel flow channel blocked at a first end thereof and open at a second end thereof in fluid communication with the outlet of the body so that fluid flowing into the inlet of the body flows past the first end of the hollow mandrel and then through the at least one hole, through the mandrel, to the second end of the hollow mandrel, to the outlet of the body, and out from the body, the hollow mandrel's first end having flow directing means for directing flow of fluid entering the body through the inlet and for directing solids entrained in said fluid away from the hollow mandrel, the flow directing means including at least one vale projecting outwardly from the first end of the hollow mandrel and spaced apart from the interior wall of the body for inducing turbulence in the fluid entering the body, and the flow directing means comprising a hole shield about the at least one hole to direct solids away from the at least one hole, and wherein there are a plurality of holes and hole shields and the hole shields are connected to each other.

5. A flow restrictor for restricting fluid flow through a flow channel, the flow restrictor disposable to intercept and restrict the fluid flow, the flow restrictor comprising a body with an interior wall and with an interior space therein and an inlet and an outlet in fluid communication with the interior space, a hollow mandrel with a first end, a second end, and a mandrel flow channel therethrough, the first end spaced apart from the interior wall of the body, at least one hole through the mandrel in fluid communication with the mandrel flow channel, the mandrel flow channel blocked at a first end thereof and open at a second end thereof in fluid communication with the outlet of the body so that fluid flowing into the inlet of the body flows past the first end of the hollow mandrel and then through the at least one hole, through the mandrel, to the second end of the hollow mandrel, to the outlet of the body, and out from the body, the hollow mandrel's first end having flow directing means for directing flow of fluid entering the body through the inlet and for directing solids entrained in said fluid away from the hollow mandrel, the flow directing means including at least one vale projecting outwardly from the first end of the hollow mandrel and spaced apart from the interior wall of the body for inducing turbulence in the fluid entering the body, and the flow directing means comprising at least one deflection plate mounted to the hollow mandrel at an end near the inlet.

6. The flow restrictor of claim 5 wherein the at least one deflection plate is two deflection plates which meet along a line near the inlet of the body.

7. The flow restrictor of claim 6 further comprising two flow-directing vanes, a first vane disposed between the deflector plates and on one side of the hollow mandrel and a second vane disposed between the deflector plates and on a side of the hollow mandrel diametrically opposed to the first vane.

* * * * *